United States Patent
Becker et al.

(10) Patent No.: US 7,664,769 B1
(45) Date of Patent: Feb. 16, 2010

(54) AUTOMATION SYSTEM WITH AUTOMATION OBJECTS WITH A DIRECTORY STRUCTURE AND METHOD FOR THE MANAGEMENT OF AUTOMATIONS OBJECTS IN A DIRECTORY STRUCTURE

(75) Inventors: Norbert Becker, Erlangen (DE); Georg Biehler, Nürnberg (DE); Matthias Diezel, Laufamholz (DE); Albrecht Donner, Markersdorf (DE); Dieter Eckardt, Herzogenaurach (DE); Harald Herberth, Oberasbach (DE); Manfred Krämer, Wendelstein (DE); Dirk Langkafel, Effeltrich (DE); Ralf Leins, Ispringen (DE); Ronald Lange, Fürth (DE); Walter Möller-Nehring, Erlangen (DE); Jürgen Schmoll, Markt Berolzheim (DE); Karsten Schneider, Erlangen (DE); Ulrich Welz, Herzogenaurach (DE); Helmut Windl, Peisig (DE)

(73) Assignee: Siemens Aktiengesellschaft, Munich (DE)

( * ) Notice: Subject to any disclaimer, the term of this patent is extended or adjusted under 35 U.S.C. 154(b) by 721 days.

(21) Appl. No.: 09/936,047

(22) PCT Filed: Mar. 9, 2000

(86) PCT No.: PCT/DE00/00737

§ 371 (c)(1),
(2), (4) Date: Feb. 13, 2002

(87) PCT Pub. No.: WO00/54147

PCT Pub. Date: Sep. 14, 2000

(30) Foreign Application Priority Data

Mar. 9, 1999 (DE) .................................. 199 10 537

(51) Int. Cl.
*G06F 17/30* (2006.01)
(52) U.S. Cl. .................. 707/102; 707/103 R; 707/101; 707/3
(58) Field of Classification Search .............. 707/1, 707/3, 102, 103, 6, 10, 100; 345/866; 718/100, 718/106; 709/206; 719/315; 703/3, 100, 703/102, 103
See application file for complete search history.

(56) References Cited

U.S. PATENT DOCUMENTS

| 5,790,116 A * | 8/1998 | Malone et al. ............... 715/763 |
| 5,987,242 A * | 11/1999 | Bentley et al. ................ 703/13 |
| 6,098,111 A * | 8/2000 | Maegawa et al. ........... 719/310 |
| 6,289,334 B1 * | 9/2001 | Reiner et al. .................... 707/3 |
| 6,584,179 B1 * | 6/2003 | Fortier et al. ............. 379/88.01 |

OTHER PUBLICATIONS

Orfali et al., CRBA Metadaa: IDL and Interface Repository, pp. 91-122 (1996).
Schwarz, C'T Magazin Fur Computer Technik, vol. 3, pp. 256-258, 260-264, 266, 268, 270-273 (1997).
Maffeis, IEEE, Xp0007225336, pp. 188-197 (1996).

* cited by examiner

*Primary Examiner*—Cam Y T Truong
(74) *Attorney, Agent, or Firm*—Harness, Dickey & Pierce

(57) ABSTRACT

An automation system includes at least one automation object, with a directory for storing object names of the at least one automation object. An object name is assigned a directory entry which includes first information data as a reference to the automation object; second information data as a description of technological functionality; and third information data as a description of interfaces of the automation object. This results in immediate and permanent access to currently created (partial) solutions, so that parallel and/or distributed working on automation objects is possible.

2 Claims, 2 Drawing Sheets

AUTOMATION SYSTEM WITH AUTOMATION OBJECTS WITH A DIRECTORY STRUCTURE AND METHOD FOR THE MANAGEMENT OF AUTOMATIONS OBJECTS IN A DIRECTORY STRUCTURE

This application is the national phase under 35 U.S.C. § 371 of PCT International Application No. PCT/DE00/00737 which has an International filing date of Mar. 9, 2000, which designated the United States of America, the entire contents of which are hereby incorporated by reference.

FIELD OF THE INVENTION

The invention relates to an automation system which has at least one automation object.

BACKGROUND OF THE INVENTION

An automation system of this type is used in particular in the area of automation technology. An automation system of this type generally includes a multiplicity of individual automation objects, which are frequently highly dependent on the automation object of the engineering system respectively used. This has the consequence that automation objects of one manufacturer often require their own engineering system and cannot be used in other systems with automation objects of other manufacturers.

Robert Orfali et al: "The Essential Distributed Objects Survival Guide", 1996, John Wiley & Sons Inc., New York, USA, XP002152444, discloses the standardized middleware CORBA, which allows location-, platform- and implementation-independent communication between applications. The CORBA Version 2.0 makes it possible for messages be exchanged between Object Request Brokers (ORB) of various manufacturers and in particular also over the Internet. An ORB makes it possible for a client to send a message transparently to a server object, the server object being able to run on the same machine or another machine. The ORB is responsible for finding the server object, calling up the function there, transferring the parameters and returning the result to the client.

SUMMARY OF THE INVENTION

The invention is based on the object of specifying an automation system which makes it possible for automation solutions to be created on a parallel and/or distributed basis.

This and/or other objects are achieved by an automation system with the features specified in claim 1.

The invention is based on the realization that in previous solutions, the data of the automation solution were generally stored in a central data store such as a database system. The data storage system then controlled the access of various users to the data. In this case, it was ensured that each user only saw consistent data and is isolated from changes made by other users. This generally took place by a user being granted exclusive access to his required data. In this time, these data were not available to other users for working on them. Therefore, this solution had the following disadvantages:

No parallel working: users could only work on the same data records one after the other.

Slow exchange of partial results: results only became usable for other users when the data had been released again by the last person working on them.

No joint working: a number of users could not work on the same objects together and exchange interim results.

The solution according to the invention permits immediate and permanent access to currently created partial solutions by the special way in which the directory is structured as a directory service. The directory service provides all developers with access to the current partial solutions and automation objects. This results in the following advantages:

Parallel working: users can work on the same data records, required for different tasks (for example interconnection and parameterization), on a parallel basis.

Immediate availability of partial results: results become usable for other users more quickly, not only when the data are released again by the last person working on them.

Joint working: a number of users can work on the same objects together and exchange interim results.

Distributed working: users can work on a (spatially) distributed basis; by means of the directory, they can, if need be, always re-synchronize the stages they have reached in working.

BRIEF DESCRIPTION OF THE DRAWINGS

The invention is described in more detail and explained below on the basis of the exemplary embodiments represented in the figures, in which.

DETAILED DESCRIPTION OF THE PREFERRED EMBODIMENTS

Figure 1:
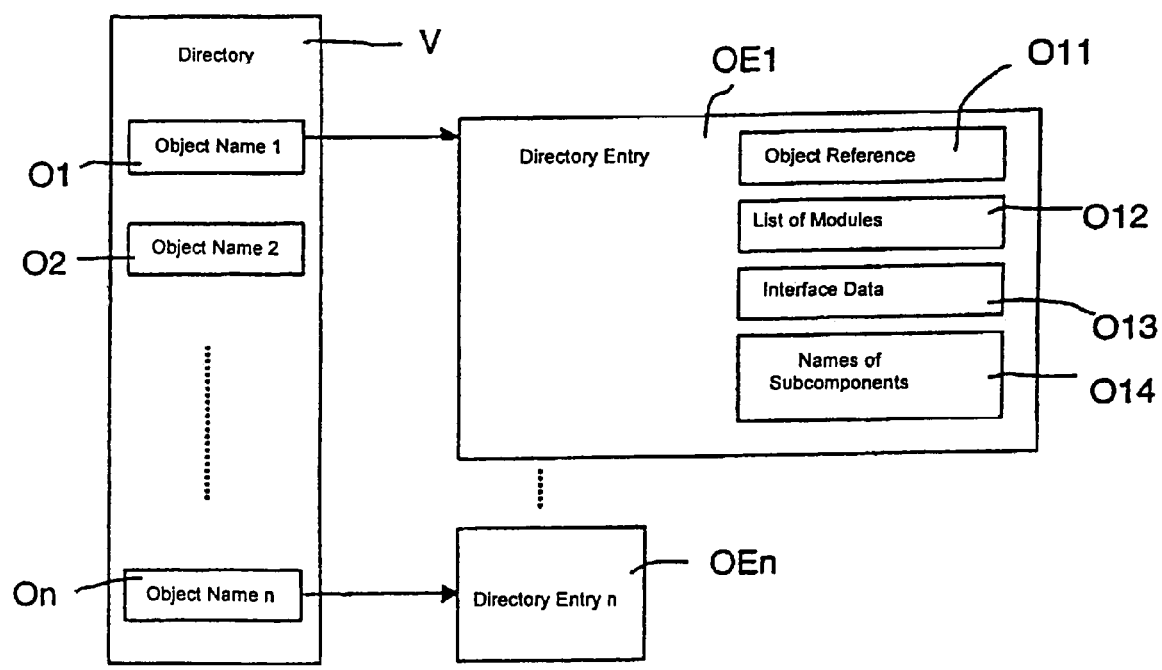
FIG. 1 shows a basic representation of how a directory is structured and its entries and FIG. 2 shows a schematic representation of the use of the directory entries.

FIG. 1 shows a basic representation of how a directory is structured and its entries. The automation system has a directory V, in which object names O1 ... On of automation objects can be stored. Each object name O1 ... On is assigned a directory entry, which contains first information data O11 for an object reference, second information data O12 as a list of the modules contained in the automation object, third information data (O13) for the identification of interface data and fourth information data (O14) with names of subcomponents.

With the aid of the directory structure shown in FIG. 1, references to created (partial) solutions and/or automation objects are stored with descriptive data. As in a telephone book, the name of the object can be used to find its reference (i.e. its telephone number).

Along with a reference to the actual object, the entry includes a description of its technological functionality through the list of names of the modules contained, a listing of the names of any subcomponents and a description of its interface, which makes it possible for other objects/tools to use the objects referenced in this way.

Figure 2:
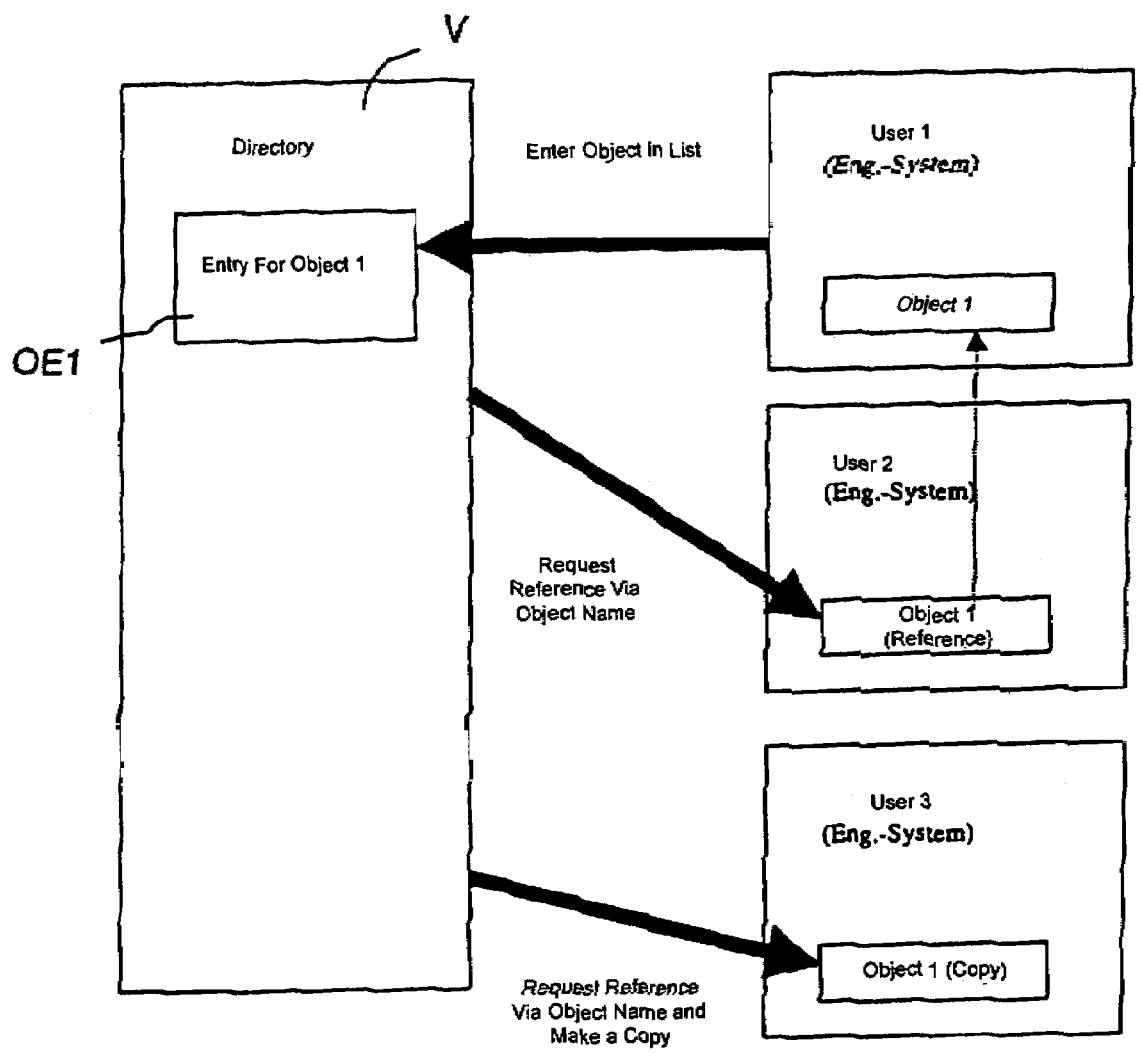

FIG. 2 illustrates a schematic representation of the use of the directory entries. After the creation of an object, it is entered at certain points in time in the directory as entry OE1 for a first automation object. It can then be viewed by other users/tools. They can then use the name to request a reference to the object and work on or copy the latter directly.

Entering or changing or removing an object entry in the directory does not have to take place instantaneously. Here, too, the analogy with a telephone book again applies: even if individual entries become invalid, as a whole it can still be used. This property is important in particular in the case of distributed working, since the communication expenditure is minimized in this way. If an object is still in the directory, but no longer available, this is indicated when it is attempted to request a copy.

To sum up, the invention consequently relates to an automation system which has at least one automation object 1, with a directory V for storing object names O1 . . . On of the automation objects, an object name O1 . . . On being assigned a directory entry Oe1 . . . Oen which has first information data O11 as a reference to the automation object, second information data O12 as a description of the technological functionality and third information data O13 as a description of interfaces of the automation object. This results in immediate and permanent access to currently created (partial) solutions, so that parallel and/or distributed working on automation objects is possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An automation system for creating an automation solution in automation technology, said system comprising:

a plurality of automation objects which are alterable by a user, each automation object realizing a partial automation solution;

a central data store for entering and storing object names of automation objects, as directory entries in a directory, wherein each object name includes, first information data as a reference to the automation object, second information data as a description of technological functionality of the automation object, and third information data as a description of an interface of the automation object, wherein the automation object, when in the directory, is viewable by at least one of another user and a tool, and wherein the object name of the automation object is usable to request a reference to the automation object to be worked on by a plurality of users in parallel to create the automation solution in automation technology.

2. The automation system as claimed in claim 1, wherein each directory entry includes fourth information data for listing the names of subcomponents of the automation object.

\* \* \* \* \*